(12) United States Patent
Boillot et al.

(10) Patent No.: US 8,139,029 B2
(45) Date of Patent: Mar. 20, 2012

(54) METHOD AND DEVICE FOR THREE-DIMENSIONAL SENSING

(75) Inventors: Marc Boillot, Plantation, FL (US); Jason McIntosh, Sugar Hills, GA (US)

(73) Assignee: NaviSense, Plantation, FL (US)

( * ) Notice: Subject to any disclaimer, the term of this patent is extended or adjusted under 35 U.S.C. 154(b) by 999 days.

(21) Appl. No.: 11/683,410

(22) Filed: Mar. 7, 2007

(65) Prior Publication Data

US 2007/0211022 A1   Sep. 13, 2007

Related U.S. Application Data

(60) Provisional application No. 60/779,868, filed on Mar. 8, 2006.

(51) Int. Cl.
*G06F 3/033* (2006.01)
*G09G 5/08* (2006.01)

(52) U.S. Cl. ..................................................... 345/158

(58) Field of Classification Search .................. 345/156, 345/158, 173, 175–177; 178/18.04, 18.09, 178/19.02, 19.05
See application file for complete search history.

(56) References Cited

U.S. PATENT DOCUMENTS

| | | | | |
|---|---|---|---|---|
| 4,506,354 A | * | 3/1985 | Hansen | 367/101 |
| 4,973,156 A | * | 11/1990 | Dainis | 356/141.5 |
| 5,274,363 A | | 12/1993 | Koved | |
| 5,367,614 A | * | 11/1994 | Bisey | 345/419 |
| 6,130,663 A | | 10/2000 | Null | |
| 6,137,427 A | | 10/2000 | Binstead | |
| 6,313,825 B1 | | 11/2001 | Gilbert | |
| 6,937,227 B2 | | 8/2005 | Qamhiyah | |
| 7,078,911 B2 | | 7/2006 | Cehelnik | |
| 7,081,884 B2 | | 7/2006 | Kong | |
| 7,092,109 B2 | | 8/2006 | Satoh | |
| 7,130,754 B2 | | 10/2006 | Satoh | |
| 2005/0273533 A1 | * | 12/2005 | Hughes | 710/62 |
| 2006/0092022 A1 | | 5/2006 | Cehelnik | |
| 2006/0161871 A1 | | 7/2006 | Hotelling | |
| 2006/0256090 A1 | | 11/2006 | Huppi | |

* cited by examiner

*Primary Examiner* — Amr Awad
*Assistant Examiner* — Kenneth Bukowski

(57) ABSTRACT

An apparatus (100) and method is provided that identifies and tracks a relative location and movement of an object in a three-dimensional space. The sensing unit includes a processor (122) for communicating a coordinate information of the object within the three-dimensional space. The method includes emitting a pulse from a first transducer (101), estimating a time of flight from a reflection signal received by a second transducer (102), and determining a location and relative movement of the object from the time of flight measurements. The sensing unit can provide touchless control via touchless finger depression actions, finger slide actions, finger release actions, and finger hold actions.

20 Claims, 3 Drawing Sheets

KEYBOARD EMBODIMENT

MOBILE DEVICE EMBODIMENT

LAPTOP EMBODIMENT

US 8,139,029 B2

METHOD AND DEVICE FOR THREE-DIMENSIONAL SENSING

CROSS REFERENCE TO RELATED APPLICATIONS

This application claims the priority benefit of U.S. Provisional Patent Application No. 60/779,868 entitled "Method and System for Three-Dimensional Sensing" filed Mar. 8, 2006, the entire contents of which are hereby incorporated by reference.

This application also incorporates by reference the following Applications: Ser. No. 11/683,412 entitled "Application Programming Interface (API) for Sensory Events", Ser. No. 11/683,413 entitled "Visual Toolkit for a Virtual User Interface", Ser. No. 11/683,415 entitled "Virtual User Interface Method and Device Thereof", and Ser. No. 11/683,416 entitled "Touchless Tablet Method and Device Thereof" all filed on the same day as this Application.

FIELD OF THE DISCLOSURE

The present embodiments of the invention generally relate to the field of sensory systems, and more particularly to input devices.

BACKGROUND

A computer system generally includes a mouse to navigate and control a cursor on a computer display. The cursor can move in accordance with the motion of the mouse. A touchpad or stick can also be used to control the cursor on the display. The mouse, touchpad, and stick generally require physical movement to assume control of the cursor. A touchscreen can also serve as an input device and allow a user to touch the screen for performing an input action or receiving a response. Touch screens do not generally require control of a cursor since the information is presented directly on the display. The input devices and pointing devices require some form of physical contact with the device. The device responds in accordance with physical movement placed on the device. In certain applications, it may be more advantageous to interact with a computer system without resorting to physical handling of the device. For example, in operating rooms it is especially important to provide sanitary conditions. A nurse practitioner or assistant may interface with a computer in the operating room and may be subject to contamination from the keyboard or the touchscreen. As another example, there may be limited room for a user to use a touchpad on a laptop or a mobile device. For example, business travelers may find it difficult or awkward to handle a mouse, a touchpad, or a stick in a confined area. A need therefore exists to provide a means of interfacing with a computer or mobile device without physically handling an input device or pointing device.

SUMMARY

Broadly stated, embodiments of the invention are directed to an apparatus and method for touchless sensing. In one arrangement, the method can identify and track a relative location and movement of an object in a three-dimensional space. In one arrangement, the sensing unit can include members each having at least one sensing element and a controller communicatively coupled to the touchless sensing unit. The controller can communicate coordinate information of the object within a three-dimensional space. In one arrangement, the sensing unit can be integrated within a keyboard, laptop, or mobile device. The touchless sensing unit can identify and track a location and movement of an object in a sensing field or imaging field of the sensing unit.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
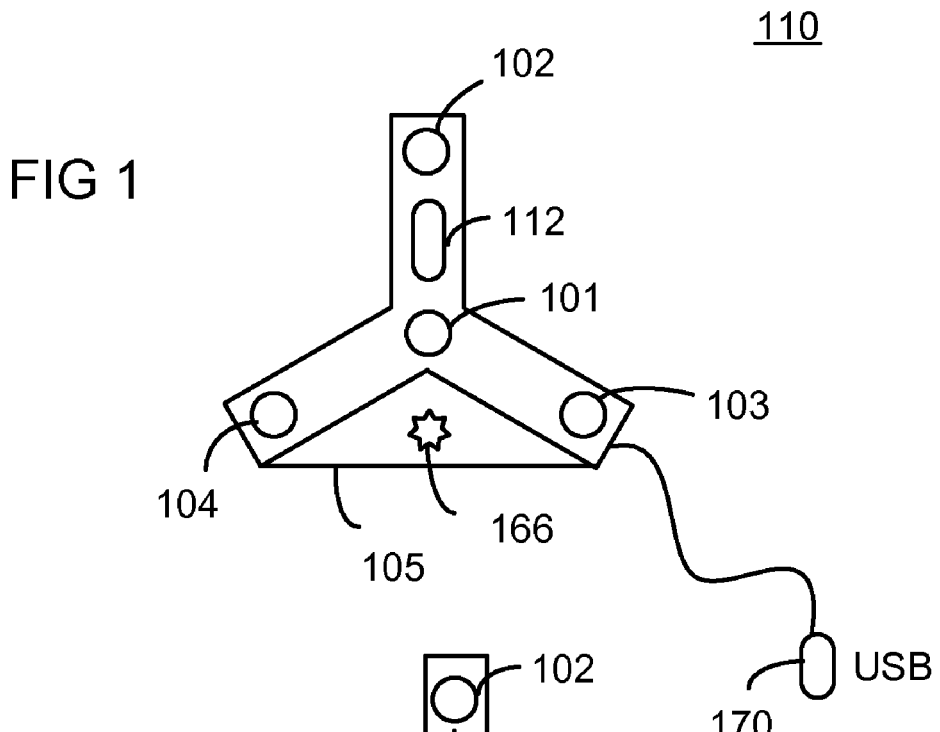
FIG. 1 illustrates a first configuration of a sensing unit in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term touchless sensing is defined as sensing movement without physically touching the object causing the movement. The term mounted is defined as a being attached to, connected to, part of, integrated within, associated with, coupled to, adjacent to, or near. The term cursor is defined as a cursor on a display and providing control to an underlying object. The cursor can be a handle to an object in the display, or a physical object remote from the display but visually controlled using the cursor on the display. The term cursor object is defined as an object that can receive coordinate information for positioning the object.

One embodiment is directed to a sensing unit that can be included within a communication device such as a laptop, keyboard, or a mobile device. The sensing unit can include an array of sensing elements aligned above the communication device or along a periphery of a display of the communication device for identifying and tracking two and three dimensional navigation of a finger. At least one sensing element can be embedded within a boundary of the display for providing a three-dimensional sensing for determining a finger action above the communication device. A controller can be communicatively coupled to the array and the least one sensing elements for communicating a coordinate information of the finger to the laptop. In one arrangement, the controller can determine an angle of the display from the arrangement of sensing elements which can be used for determining a location of the finger. The sensing unit allows a user to interact with a computer or mobile device using touchless finger actions through a virtual user interface.

Another embodiment is directed to a method for identifying and tracking a relative location and movement of an object in a three-dimensional space. The method can include emitting a pulse from a first transducer, estimating a time of flight between when the pulse was transmitted from the first transducer and when a reflection of the signal off an object in the three-dimensional space was received from a plurality of transducers for producing multiple time of flight measurements, and determining a location and relative movement of the object. In one application, the object can be a finger, and the method can identify and track the location and behavior of finger movement for navigating and controlling a cursor object on a display or for controlling a user interface. The method can include detecting a touchless finger depression action, a touchless finger slide action, a touchless finger release action, and a touchless finger hold action for invoking a response on a graphical user interface.

Referring to FIG. 1 a sensing unit 110 is shown. The sensing unit 110 can have three members each with a sensing element affixed to each member. For example, a first member can have sensing elements 102, a second member can have sensing elements 103, and a third member can have sensing elements 104. The bottom two members 104 and 103 can be combined into an a common member 105. More than one sensing elements can be affixed to each member. In one embodiment the sensing elements can be transducers that perform both transmit and receive operations. In another embodiment the sensing elements can be imaging elements that capture an image of an object in the sensory field. In yet another embodiment, the sensing elements can be optical elements that sense a change in light intensity. The sensing unit 110 can include a illumination element 166 for indicating to a user whether an object is in a sensing field or imaging field of the sensing unit 110. Multiple illumination elements can be dispersed along the sensing unit 110. The sensing unit 110 can include a BlueTooth, or USB connector 170 for conveying a coordinate signal of the object in a sensing field or imaging field of the sensing unit 110. Alternatively, the sensing unit 110 can internally include a blue tooth connectivity for communicating information to a computer in a manner similar to the USB connectivity 170, albeit wirelessly.

The sensing unit 110 can connect to a communication device such as a computer, keyboard, or a cell phone. The sensing unit 100 can convey coordinate information from an object within a sensory field of the sensing unit 110. In one arrangement, the members can project radially from a center location as shown in FIG. 1. In this arrangement the sensing unit 110 can include a center sensing elements 101. Other arrangements can place the sensing elements peripheral to a display without a need for a center transducer. The members can be spaced at approximately 120 degree angles from one another relative to the center location. In one arrangement, the center sensing elements 101 can be equidistant from each of the other sensing elements 102-104. The equidistant arrangement provides a type of mathematical symmetry which reduces a computational complexity and facilitates a tracking and detection of the sensing unit 110 for locating an object within a sensory field. The tran sensing elements sducers can be ultrasonic transducers, acoustic transducers, camera elements, CCD elements, optical elements, laser elements, or any other range measurement device. The ultrasonic transducers can operate within the frequency range 20-140 KHz. Special sonic acoustic transducers may also be used to operate within the same frequency range 20-140 KHz.

The sensing unit 110 can identify and track a relative location and movement of an object in a three-dimensional space. The sensing unit 110 can have at least two members and a controller 112 for communicating a coordinate information of an object with a sensory field according to a behavior of the object within the three-dimensional space. In one a first arrangement, shown in FIG. 1, each member can have at least one sensing elements, wherein a first sensing elements, a second sensing elements, and a third sensing elements are spaced at approximately 120 degrees from one another with respect to the center location. The center sensing elements 101 can be positioned at a location that is approximately equidistant from the sensing elements on each member. In another arrangement, the three members are approximately in the same plane. The sensing elements can also be pointing approximately towards a common region of focus. Improved resolution and accuracy can be achieved by careful positioning and focusing of the sensing elements to a region of general object activity.

The illumination element 166 can change behavior as a function of the finger position. For example, the object causing the movement may be a finger and the behavior is a light pattern such as a changing color, intensity, contrast, or brightness. In another example, a light pattern can be a sweep of a laser element generating a pattern, outlining a pattern, or producing a time-varying shape. The illumination element can change a color pattern as the object (e.g. finger) moves around within a field of view. A color pattern can have attributes such as blinking rate, contrast, hue, intensity and color. The lighting effects, (e.g. attributes), can change as a function of the finger position. In one arrangement, the illuminating element 166 can produce a light pattern on the finger. For example, when the illuminating element 166 is behind the keys of the keyboard 100 and projecting a light pattern through the keys, the intensity of the light pattern can be sufficient to produce a light pattern on a finger above the keyboard. Understandably, the light pattern provides visual feedback to inform a user of the boundaries of control. For example, the colors of the lighting pattern change as a user moves a finger within a field of view of the sensing unit 110. The field of view includes a plurality of boundary regions each associated with at least one color, wherein the illumination element changes to a color when a finger is positioned in a boundary region.

Figure 2:
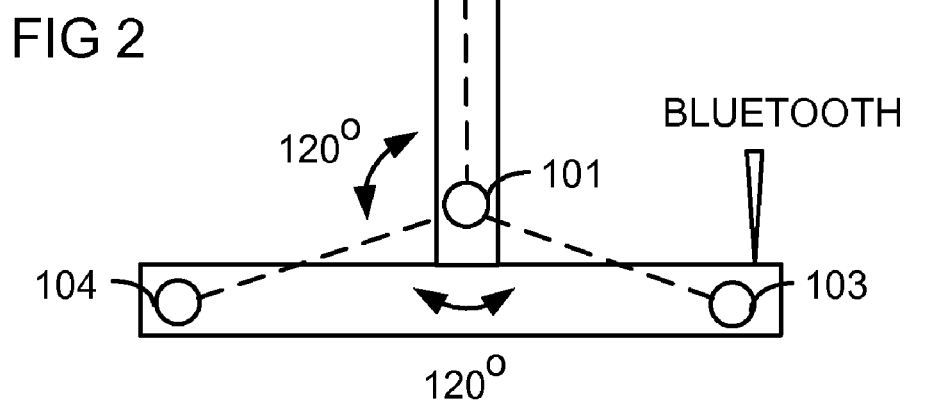
FIG. 2 illustrates a second configuration of the sensing unit in accordance with an embodiment of the inventive arrangements.

Referring to FIG. 2, the sensing unit 110 is shown in an alternate arrangement. In this configuration, the first member (102) forms a tower portion and the second and third members (103/104) form a base portion. A backing portion can be applied for support. Notably, the three sensing elements 102-104 are still located equidistant from a sensing elements 101 at the center location. Even though the structure of the members has changed, the symmetry between the sensing elements is preserved. This structure can be suitable when the sensing unit 110 may be placed on a flat surface such as a desk of a keyboard. The symmetry also allows for three-dimensional sensing of an object. Also, the sensing unit is not limited to keeping the sensing elements in a symmetrical or radial arrangement. It is clearly possible to extend one of the members beyond the length of the other two members while still retaining an ability to track and detect object movement within the sensory field produced by the sensing elements. Understandably, various configurations and structures of the members are possible while still retaining the symmetry of the transducer arrangements.

Figure 3:
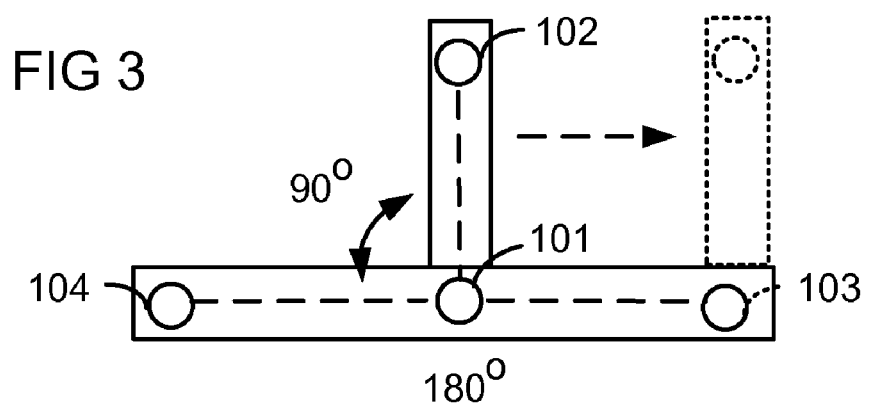
FIG. 3 illustrates a third configuration of the sensing unit in accordance with an embodiment of the inventive arrangements.

Referring to FIG. 3, another arrangement is shown for the sensing unit 110. In this configuration, the symmetry between the sensing elements has not been preserved, though the device can still perform similarly. In this arrangement each member can have at least one sensing element, wherein a first and a second member are spaced at approximately 90 degrees, a second and third member are spaced at approximately 90 degrees, and the third and the first member are spaced at approximately 180 degrees to one another. The tower can also be located to the left of the right of the sensing unit 110 thereby producing a structure have an approximate "L" shape. The bottom portion consisting of sensing elements 104, 101, and 103 provide for two dimensional sensing, while the tower member (102) provides a third dimension of sensing, or aspect. Namely, the sensing unit can determine a two-dimensional coordinate using sensory information provided by the bottom unit, and may rely on the tower portion (102) to determine when an action is being taken. For example, when the sensing unit 110 is detecting movement of a finger, the bottom portion can track a location and position of the finger, and the tower portion (102) can identify a finger action, such as a forward push or a retracting motion.

Figure 4:
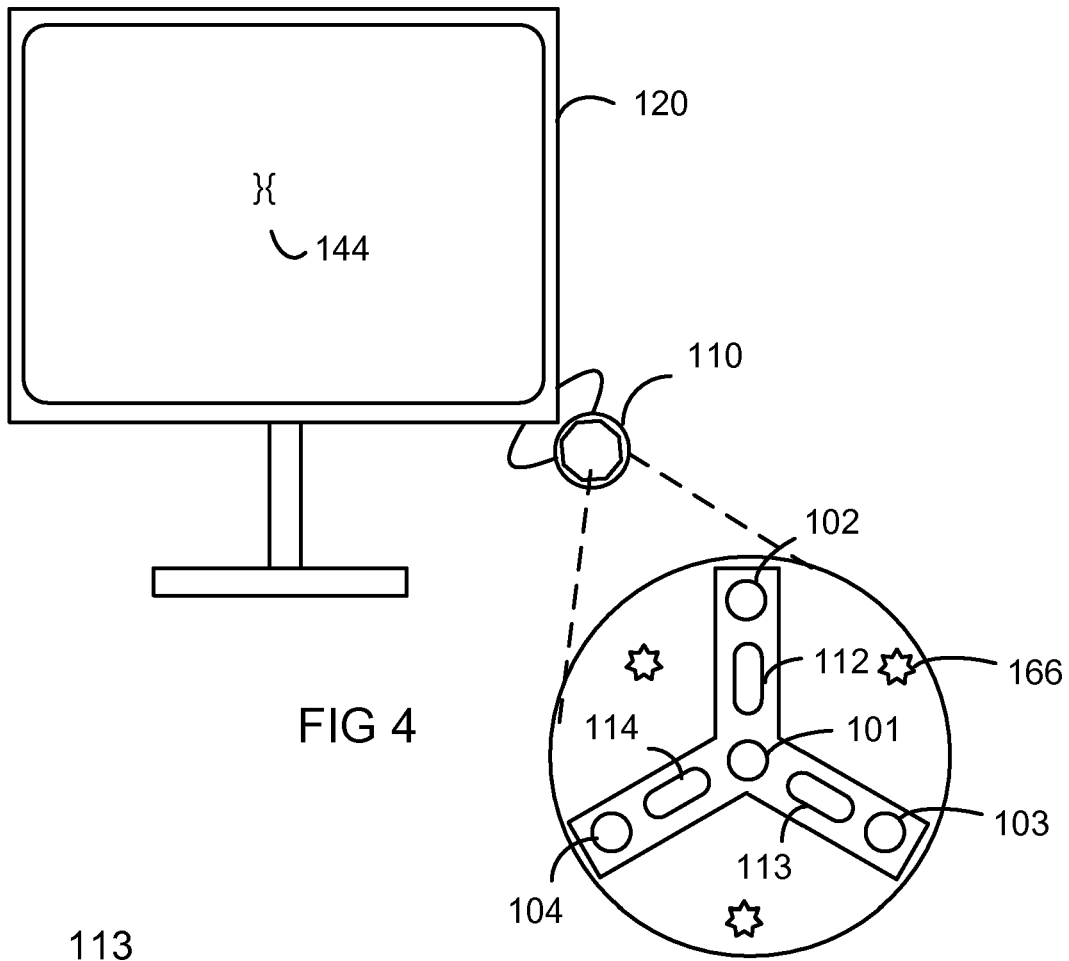
FIG. 4 depicts a sensing unit coupled to a display in accordance with an embodiment of the inventive arrangements.

Referring to FIG. 4, the sensing unit 110 is shown in the context of a display. In this arrangement, the sensing unit 110 can be coupled to the display 120 such that a person can interact with the display through the sensing unit 110. The sensing unit can include a circular type shape such that a user can identify a region of touchless finger movement. The sensing unit 110 can detect 3D movement within the circular region as well as exterior to the region. The sensing unit can perform as an input pointing device similar to a mouse, a touchpad, a touchscreen or a stick. Input pointing devices allow a user to interface with a computer system. For example, a user can move a cursor object on the display using a standard computer mouse. Moving the mouse on a flat surface such as a desktop moves the cursor on the display in accordance with the two-dimensional movement of the mouse on the desk. Similarly, a touchpad allows a user to navigate a cursor within a display by moving a finger across a surface in a two-dimensional field. Similarly, a stick can be used like a joystick to move a cursor around on the display. These input devices are generally accompanied by a pair of buttons for performing single click, double click, right click, and left click operations. The buttons allow the user to interact with an application once the cursor object has been positioned at a point of interest. For example, a user may navigate a cursor to a hyperlink, and to activate the hyperlink, the user depresses a button or performs some physical action.

In the exemplary configuration of FIG. 4, a user can perform touchless mouse behaviors by moving a finger within a sensory field of the sensing unit 110. For example, a user can position a finger in front of the sensing unit and move the finger in a vertical and horizontal direction which the sensing unit 110 can convert to coordinates or relative differences in motion. The sensing unit 110 can convey the coordinates to an application running on a computer, mobile device, or communication system, that can interpret the coordinates and perform a navigational task or specific control action. As one example, a user can move a finger within the touchless sensing field to control a cursor object on a display 120. The sensing unit 110 can detect forward projections and retractions and convert these finger actions to mouse commands such as single click, hold, scroll, slide, double click, and release. Notably, the sensing unit can detect two-dimensional movement in a vertical and horizontal field, as well as a third dimension in a lateral plane. Understandably, finger motion in the vertical and horizontal axes can correspond to moving a cursor object in an x and y direction on the display. A finger depress action, forward action, or retracting can activate a mouse command such as a single click.

In one aspect, the relative displacement of cursor movement can be a function of finger location. For example, when a finger is within a center region of a touchless sensing field, a more precise navigational control is offered. That is, the cursor object responds with more sensitivity when the finger, or object, is within the center region (101). This can allow for precise movement. When the finger is farther from the center (101) or outside the circular region the cursor response (i.e. relative movement) is more coarse. Accordingly, a user can navigate from a coarse location to a fine location by starting from a broad outside region and moving into the center region. For example, vertical and horizontal movement can correspond to X and Y cursor movement. Depth movement can correspond to resolution, or speed. Resolution can be controlled by a combinational weighting of actual location and relative location. For example, when the finger is positioned farther from the sensing unit 110, more coarse movement is applied to the cursor object. As the finger moves closer to the sensing unit 110, the coarse movement becomes finer allowing for more accurate navigation. Also, broad movement can correspond to actual location information whereas focused movement can correspond to relative movement.

As an example, a user may want to move the cursor to the lower right hand corner. The user can place the finger broadly away from the sensing device (3-4 inches away from the sensing unit) and an actual location of the finger can be determined, for example using Time of Flight measurements (TOFs) when the sensing elements are acoustic transducers. The TOFs can reveal the positional placement of the finger which correlates to the bottom right corner. In another arrangement, when the sensing elements are optical elements, a change in pixel intensity can be used to evaluate a relative displacement. For example, as the object moves, the pixel intensity increases or decreases in accordance with the movement. Similarly, when infrared sensory or laser elements are used, a change in light intensity can be evaluated to track the object movement and location. Briefly, when an imaging sensor is used as a sensory element, a location of the object in the imaging field can be determined through edge detection methods that identify changes in pixel intensity, such as a gradient.

Regardless of the sensory element employed, the sensing unit 110 can in one example establish a base reference at the bottom corner location. As the user moves the finger closer in (1-2 inches away from the sensing unit), the sensing unit uses a combination of broad location and relative displacement to update the location. If the only actual location was used, the cursor object would move with the same displacement regardless of position; that is, the cursor object would move to the actual location that the TOF calculations predict the finger to be. However, when relative movement is include, additional flexibility is allowed in changing the cursor displacement sensitivity and accordingly the flexibility of user navigational control. Thus, the finger starts out at a far away location and moves towards the center to gain finer cursory control. If the user wants to relocate position, or the cursor, the finger is retracted to a farther away location (3-4 inches from sensing unit) and the sensing unit 110 re-establishes a base reference location. Again, the user can move the finger closer in (0-2 inches from sensing unit) to the sensing unit and the unit applies a combination of location and relative displacement to change the sensitivity of the cursor movement, or touchless control. The combinational aspect of actual location and relative displacement allows for more control. In another aspect, the base coordinate can be updated at one of a faster or slower time interval in accordance with the proximity of the finger to the sensing unit. Precise movement can be obtained as the relative displacement information is provided on a more timely basis.

Embodiments of the invention are not limited to controlling a cursor. A coordinate or relative coordinate can be determined for any object within the 3D sensing field (or imaging field). Furthermore, the touchless sensing unit can create a virtual interface for interacting with controls of a computer system or surface size limited mobile device. A coarse location of the object can be estimated using an actual estimate of the object's location using TOFs (e.g. acoustic transducers) or pixel intensity differences (e.g. optical) when the object is at a far distance from the sensing unit. The coarse location can be updated using a relative displacement of the object using phase differences for acoustic sensing, or translational differences in pixels for optical sensing when the object approaches to a close distance of the sensing unit. A combinational weighting factor of the actual location and relative displacement can be employed as the object moves between the far distance and the close distance. When using acoustic sensing, a phase differential can correspond to a relative displacement of the object such as measured by a differential time of flight, and a TOF can correspond to an actual location of the object such as measured by a time difference between an emitted pulse and received reflection. When employing optical sensing, a pixel difference can be translated to relative differences, and a pixel intensity can correspond to a location. A base coordinate of the object can be referenced at an actual location when the object is at a far distance from the sensing unit, and the base coordinate can be updated using the relative displacement as the object nears closer to the sensing unit.

The sensing elements 101-104 affixed to the sensing unit create a three-dimensional sensing field, or imaging field, that allows the sensing unit to identify and track a location of an object within the sensing field, or imaging field. In one arrangement, though not herein limited, the sensing unit 110 can use ultrasonic sensors with a processor using pulse-echo detection for locating the position of an object within a sensory field of the sensing unit 110. The intensity and sensitivity area of the sensing field depends on the signal strength of the signals pulsed out from the transmitters, and the ability of the sensing unit 110 to resolve echo signals. In a pulse-echo system, a transmitter emits a high frequency and high energy pulse which may be reflected off an object. The energy decay of the pulse depends on the medium, such as air or liquid, and the pulse frequency. Generally, a 40-120 KHz pulse frequency is suitable for air, whereas, much higher frequencies in the 2 GHz are suitable for liquid. It should also be noted that using low frequency pulse frequencies for short range measurements can introduce overlap in reflected signals. This can make signal detection at short ranges more complicated since the reflected signal interferes with a ring-down of the transmitted signal.

In one arrangement, the length of an appendage may be less than 6-8 cm, with a spacing of sensing elements of approximately 4-5 cm. In such a configuration, when ultrasonic sensors are used, a sensor element acting as a transmit element that emits a pulse may continue to ring during a reflection and reception of the reflected signal. The ring is a residual decay of energy from emitting the pulse. For example, if sensory 101 emits a pulse which reflects off an object and the reflection signal is captured at sensor 103, the ringing effect from sensory 101 may overlap with the reflection signal causing distortion. The ringing effect can be suppressed in the reflected signal by subtracting the contribution of the ringing from the reflected signal.

If the object is within close proximity, a reflection signal will be generated from the scattering of the high energy pulse on the object. Reflection signals will be sent back towards the sensing unit 110 that can captured by receiver elements. Notably, the signal is generally high frequency as less energy is dissipitated during transmission and reception of a high frequency pulse in air. Ultrasonic transducers and special sonic acoustic transducers are capable of operating at high frequencies such as 40 KHz for use in air mediums. In a pulse-echo system a pulsed signal is transmitted towards an object and a reflection signal is identified. A time of flight measurement describes the time expiring between when the signal was emitted and when the signal was received. The symmetry of the sensing elements as shown in FIG. 1 provides signal processing advantages when working with reflection signals having interference patterns due to ring-down of a transmitter.

In addition to the controller 112, the sensing unit 110 can include an analog or digital chip 113 containing a processor 122, a converter 123, an amplifier 123, and a timer 124. The chip is not limited to these components and can contain fewer or more than the components listed. The processor 122 determines when a movement is detected and identifies the location of an object using time of flight measurements. The converter converts acoustic signals received from one of the receivers 102-104 into digital signals. The timer 124 determines a length of time a signal pulsed from a transmitter 101 takes to reflect off an object and be received by one of the receivers 102-104. The amplifier 123 can amplify signals emitted or amplify signals received by the receivers. The amplifier can increase the dynamic range and the resolution of the signals. In the configuration shown, the center transducer 101 acts as an emitter, and the outer sensing elements 102-104 act as receivers, though other arrangements for transmit and receive are herein contemplated. As one example, each transducer can take a turn transmitting while the other sensing elements listen. Moreover, a pattern for transmit and receive can be established based on the location and movement of the object in the sensing field or imaging field.

When ultrasonic sensors are used, the processor 122 can send a digital pulse to the emitter 101 to generate a high frequency pulse signal. The pulse signal can be of a constant frequency or a varying frequency. In practice, a simple ultrasonic transmitter produces a fixed frequency pulse with a duration corresponding to a pulse width generated by the processor 122. The processor 122 can generate various pulse shapes having specific correlation properties that make it more suitable for detection. The processor 122 can also activate a control upon detection of an activation cue. For example, an activation cue can be an intentional gesture or motioning of a finger within a field of view (e.g. sensory field). The sensing unit 110 can include a controller 112 for communicating a coordinate information of the object according to a behavior of the object within a three-dimensional space.

The field of view is an approximate three dimensional region wherein a finger movement can be identified by the sensing unit 110. For example, when the sensing unit is an sensing unit that emits a high energy pulse, the field of view corresponds to that region within which a reflected high energy pulse can be detected. The field of view can be a function of the emitted pulse strength and the range (e.g. distance). For example, an sensing unit positioned in a corner of a display or atop a keyboard may only need a range corresponding to the maximum extent of the finger. When the sensing unit is an imaging system (e.g. cameras, CCDs, lasers, infrared) the imaging field is a function of the illumination intensity and the light reflection. For example, the sensing unit can be an arrangement of imaging elements such as CCD elements, MEMS microphones, video recorders, or the like. The imaging elements can capture images of the finger movement, and pattern recognition techniques can identify movement of the finger based on common edge detection techniques. A location of the object can be identified by identifying an intersection of edges at a location of strongest pixel intensity.

The sensing unit can be positioned above the keyboard, within a mouse, within a display projecting approximately in a direction of finger movement, or peripheral to a display of a mobile device. In general, a user typing at a keyboard can extend and move the finger within a maximum range of finger motion approximated by a spherical radius under 10 to 12 inches. For example, in acoustic sensing the field is a function of the emitter strength and reflection. In imaging, the imaging field is a function of the illumination and reflection intensity. The user can move the finger within the field of view without moving the hands away from a normal typing position. The timer 124 determines a time window for which an activation cue, such as the positioning of a finger, is considered. For example, when a user intentionally places a finger directly above the sensing element for 1 second, the sensing unit 110 and the timer 124, together identify the position of the finger as a signal to commence a control, such as the enabling of a navigational control to move a cursor on the display 120. For example a control can also include a single click, double click, hold, or scroll.

Briefly, in one arrangement, the sensing unit 110 can sense finger movement within a sensory field to control a cursor object on a display 120. The sensing unit 110 can detect finger movement without the user having to manually control an input pointing device such as a mouse, a stick, a touchpad, or, having a physical apparatus connected to the user. The sensing unit 110 maps finger motion, or hand motion, to a coordinate signal for controlling movement of a second object. For example, a user controls a cursor 124 using the sensing unit 110 to interact with a computer application for performing tasks such as text editing, web browsing, checking email, messaging, code programming, playing a game, or the like. In a particular example, the user controls a cursor within a text processing application, such as to identify where text can be entered and displayed (e.g. cut and paste).

In another example, the user can control an object displayed within a program application such as a control in a user interface. The object can be local to the program application or can be an object outside of the program application. For example, the user can control an object such as a radio controlled car, a model airplane, or any other such device capable of receiving coordinate information for moving the object. The sensing unit 110 can be used to control objects in gaming, mobile device systems, multimedia rendering engines, visual rotation systems, painting applications, simulation, media control, automotive applications, adjusting audio controls, adjusting multimedia controls, and the like.

The operative aspects of the embodiments of the invention are described herein primarily in the context of moving a cursor object or controlling a user interface component through sensory detection using acoustic or image based techniques. It will be apparent to one of ordinary skill, however, that the invention applies equally well with other devices. For example, the control can be provided using a microphone array system, a beamforming array, a three-dimensional imaging system, or a laser system for acquiring finger movement and a finger location.

Embodiments of the invention also provide a method to enable and disable a control mechanism associated with controlling movement of the object, i.e. for example, a navigational control for moving a cursor object. In one embodiment, the sensor system 110 is an sensing unit for moving a cursor on a computer display. The sensing unit converts motion into coordinate signals that are input to a computer for moving a cursor. The sensing unit uses ultrasonic sensing technology to capture coordinate information using time of flight measurements of ultrasonic signals. The coordinate information can be input to a computer or other device capable of controlling a cursor object to control or navigate the cursor object around the screen. The user raises a finger above a keyboard and the ultrasonic sensor unit 110 senses the finger motion and moves the cursor object in accordance with the finger movement.

As already presented, the sensing unit 110 can include at least one transmitter and at least two receivers for transmitting and receiving ultrasonic signals. The transmitter and emitter can be the same for providing dual transmit and receive functions. In another arrangement, the sensing element can be an array of micro acoustic microphones or micro speakers for transmitting and receiving audio signals. In another arrangement, the sensing element can be CCD camera elements or MEMS camera elements for receiving light. In the case of using ultrasonic sensing elements, the sensing unit employs pulse-echo detection to estimate a range and position of an object within view of the sensing elements. A transmitter in the sensing unit emits a pulse shaped signal that reflects off an object which is detected by a receiver element in the sensing unit. The receiver element is coupled with a detector that detects a signal reflected off an object as part of the motion detection logic in the sensing unit. The detector can include additional processing logic such as thresholds, comparators, logic gates, clocks, and the like for detecting an object's motion. The sensing unit 110 calculates a position of the object causing the reflection by solving a set of geometric equations.

A single transmit and receive element pair along a same plane in the sensing unit calculates a first range (e.g. distance) of an object in the field of view. A first transmit and receive pair on an x-axis can estimates a longitudinal range of the object (e.g. finger). A second pair, arranged separately from the first pair, estimate a second range. The second pair estimates a latitudinal range of the object (e.g. finger). Accordingly, the two range measurements establish a position (e.g. location) of the object causing the signal reflection by mathematically combining the geometrically related range measurements. For example, the first range measurement establishes a x-coordinate and the second range measurement establishes a y-coordinate. The location of the object is then determined to correspond to the point (x,y) in a single plane. For example, the plane will be oriented in the direction of the first and second paired ultrasonic elements. Accordingly, a third pair can produce a range measurement in a third direction thereby establishing a three-dimensional coordinate system (x,y,z) if the first, second, and third range measurement projections are orthogonal to one another.

In particular, the sensing unit 110 having the arrangement shown in FIG. 1 provides symmetrical properties for accurately identifying the location and relative movement of an object. Namely, a time of flight associated with a first transmit and receive pair produce a complex surface wherein a location of the object can be anywhere along the complex surface. That is, a single time of flight measurement produces a locus of points in a three dimensional space that describe a possible location of the object producing the time of flight. When a second transmit and receive pair is included, a second complex surface can be generated wherein a location of the object can be anywhere along the second complex surface. Based on the symmetrical location of the transmitters, the two complex surfaces can produce a parabolic intersection curve wherein the object can be anywhere along the parabolic curve. Notably, the location of the object has been reduced from finding the location of the object on two complex surfaces to finding the location of the object on a parabolic curve. When a third transmit and receive pair is included in a symmetrical arrangement, a third complex surface can be generated wherein a location of the object can be anywhere along the surface of the third complex surface. A location of the object can be determined by identifying the intersection point between the parabolic surface generated by the intersection of the first and second complex surface, with the third complex surface. The location of the object can be uniquely specified by calculating the intersection of the three complex surfaces.

Accordingly, a relative movement of the object can be determined by calculating the relative changes in TOFs from each of the transmit-receive pairs. Changes in TOFs can be directly used to look up a corresponding change in relative position. Changes in TOFs alone can be used to determine relative changes along the principal axes in the three dimensional space. Notably, as more transmit-receive pairs are added, the number of complex surfaces increases thereby providing redundancy as to the location and movement of the object in three dimensional space. The intersection can be calculated by projecting one complex surface onto another complex surface. A gradient descent approach or steepest descent can be used to solve for the local and global minima. Other iterative numerical solutions also exist for calculating the maximum likelihood point of the object. Multiple pulse-echo time of flight measurements can be captured for smoothing out the trajectory of the object in addition to an averaging of the location of the object. Also, the pulse-echo principles are not limited to using the center transducer 101 as the emitter and the outer sensing elements as the receivers 102-104. Each of the outer sensing elements 102-104 can also be pulsed as emitter elements. That is, the sensing unit 110 can calculate a first set of time of flight (TOF) measurements using the transducer 101 as the emitter, can calculate a second set of TOFs using the transducer 102 as the emitter, and so on, wherein each transducer is used as an emitter. Notably, the TOFs can be averaged over time to smooth out discontinuities in the measurements.

In one arrangement, a first ultrasonic signal can be emitted from a first transducer from a first direction at a first time. A first and second reflection of the ultrasonic signal off the finger from the first direction can be detected by a plurality of ultrasonic transducers. A location of the finger can be determined from time of flight (TOF) measurements calculated at each transmit-receive pair. The steps of emitting, detecting, and determining a TOF for multiple directions at multiple times for generating a plurality of finger locations can be repeated. In one aspect, a set of possible finger locations can be determined from the plurality of transmit-receive pairs. The set of finger locations can be correlated to determine a finger position having a highest likelihood of producing the reflections from the multiple directions.

Figure 5:
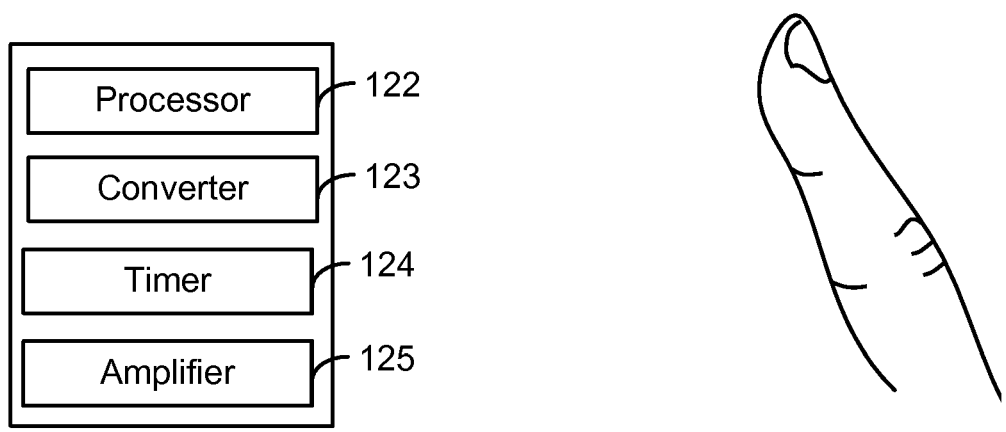
FIG. 5 illustrates a schematic of the sensing unit in accordance with an embodiment of the inventive arrangements.

For example, a first TOF and a first phase differential can be calculated between a signal emitted at a first time and a reflected signal detected at a first sensor. A second TOF and a second phase differential can be calculated between the signal emitted at the first time and a reflected signal detected at a second sensor. A third TOF and a third phase differential can be calculated between the signal emitted at the first time and a reflected signal detected at a third sensor. The calculations can occur in parallel to speed up computation time and the TOF and differentials can be calculated as they are received. Accordingly, a first estimate of a location of the object from the first TOF can be calculated, a second estimate of a location of the object from the second TOF can be calculated, and a third estimate of a location of the object from the third TOF can be calculated. At least three complex surfaces can be created as a function of the first, second, and third estimate of a location. An intersection of the at least three complex surfaces can be determined which can correspond to a coarse location of said object. The first, second, and third phase differential can be applied to the estimated location for updating the coarse location to a fine location of the object. In one aspect, the TOFs can be weighted by a phase differential. In one arrangement, for refining the trajectory of the object's movement, a history of the TOFs and the phase differentials can be tracked for predicting an error estimate, wherein the error estimate is used to produce the fine location of the object. Referring to FIG. 5, the processor 122 can perform all the calculations and computations aforementioned.

The processor 122 can also perform a fast Fourier transform (FFT) analysis tuned to a frequency of an emitted signal for estimating the time of flight. A bandpass filter centered around the center frequency of the emitter can be applied to suppress out of band noise. Understandably, the reflected signal will have significant energy within the bandwidth of the emitted signal. For example, a 40 KHz emitter will emit pulses at 40 KHz wherein most of the signal energy lies. The bandpass filter can be an IIR filter using time samples or it can be implemented as a point wise multiplication in the spectral domain. A threshold detector within the emitter bandwidth can be applied to determine a time when a reflected signal is detected. Understandably, a reflected signal will generate sufficient energy when the tap length or the FFT analysis length sufficiently centers the reflection signal. When the energy within the 40 KHz bandwidth exceeds a threshold a TOF can be measured. A phase differential can be calculated with reference to a previously stored time domain reflected signal. Understandably, to calculate a phase differential, information from a previous reflection needs to be saved to compare the differences between a first time and a second time. The phase differential can be calculated as a sample delay in the time domain or a phase change in the frequency domain.

The sensing unit 110 can contain multiple sensing elements positioned and arranged in various configurations for receiving range measurements in varying directions for calculating the position of the object causing the reflection using multi-path signal processing techniques. The sensing unit is not limited to only three sensors which are provided as example. The paired transmit and receive elements can be on a same principal axis or a different principal axis. The sensing unit can also employ beamforming techniques and pattern recognition techniques for estimating the objects location. The sensing unit 110 additionally produces differential coordinate signals for satisfying the input signal requirements of a USB or BlueTooth mouse input device connection interface. Notably, a computer mouse generally uses a USB or BlueTooth device driver for receiving differential signals for moving a cursor along each principal axis of the computer coordinate system. The sensing unit 110 produces differential signal for each principal axis to comply with the requirements of the USB or BlueTooth mouse device driver interface.

Figure 6:
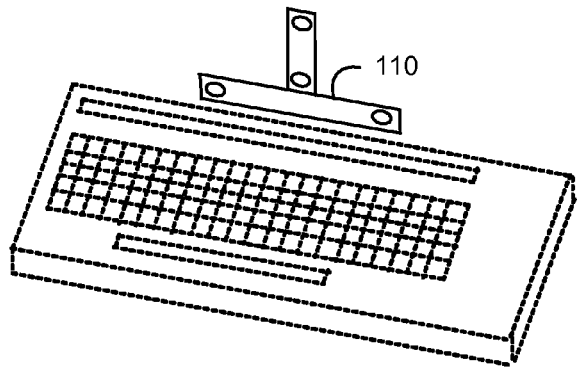
FIG. 6 depicts a sensing unit coupled to a keyboard in accordance with an embodiment of the inventive arrangements.
Figure 7:
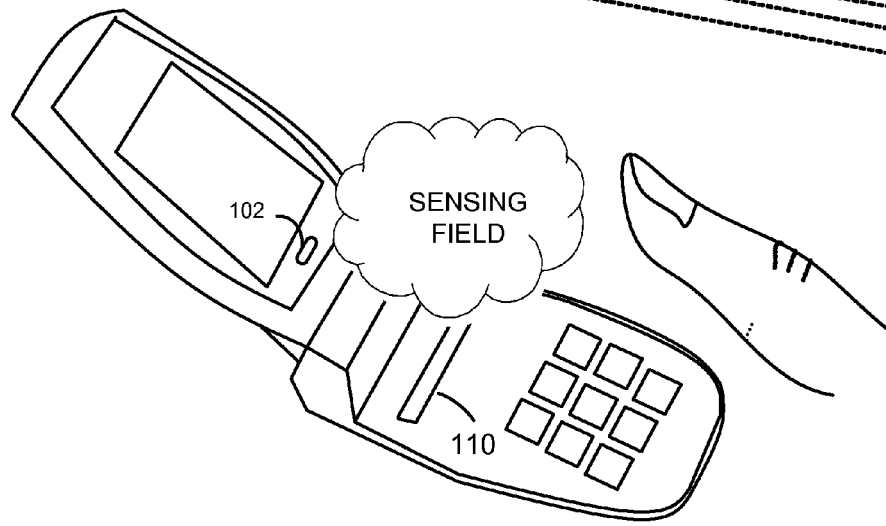
FIG. 7 depicts a sensing unit integrated within a mobile device in accordance with an embodiment of the inventive arrangements.
Figure 8:
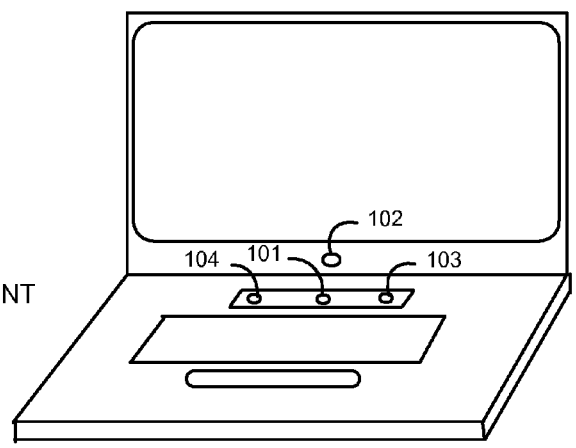
FIG. 8 depicts a sensing unit coupled to a laptop in accordance with an embodiment of the inventive arrangements.

Referring to FIG. 6, the sensing unit 110 can be mounted to the keyboard within proximity to a region of finger movement. Notably, the sensing unit 110 is positioned to detect and track finger movement above the keyboard without requiring a user to move their hands away from the keyboard. In another arrangement, shown in FIG. 7, the sensing unit 110 can be integrated within a mobile device for providing a virtual user interface to the mobile device. The sensing unit 110 can estimate the angle of the display of the mobile device by measuring a time of flight from the transducer 102. In one aspect, the controller can estimate the TOF for a pulse sent/received by the transducer 102 with respect to the sensing unit 110. The TOF between the transducer 102 and sensing unit 110 reveals the angle of the display with respect to the sensing unit 110. The angle can be used to determine an intersection point of complex surfaces used for determining a location of the finger in the sensing space. In yet another arrangement, as shown in FIG. 8, the sensing unit 110 can be integrated or mounted to a laptop. The sensing unit can be positioned above the function keys of the keyboard, or on the bottom of a display, dangling below the display, or within a mouse. The sensing unit 110 in the laptop can include an array of sensing elements (104/101/103) aligned above the laptop keyboard for identifying and tracking two-dimensional navigation of a finger above the keyboard. Another transducer (102) can be positioned within a boundary of the display for providing a three-dimensional sensing for determining a finger action above the keyboard. The transducer 102 within the laptop can send or receive a direct signal pulse from one of the sensing elements (104/101/103) along the keyboard for determining an angle of the display. Notably, the laptop display may be at any angle between 0 and 180 degrees set by the user. In determining a location of finger movement above the keyboard it is necessary to know where the sensing elements are located relative to one another. By knowing the laptop display angle, the sensing unit 110 can adjust for determining the location of the finger above the keyboard. A TOF can be evaluated and, based on the fixed location of the sensing elements on the keyboard, a location of the sensing elements relative to one another can be determined for calibrating the detection logic of the processor.

In these arrangements, a user can navigate a cursor 124 on a display 122 without moving the user's hands from a normal typing position and control commands on the cursor such as mouse behaviors. For example, the user can sign to the sensing unit by raising a finger from a normal typing position without necessarily having to move the wrists or the arms. A configuration of the sensing system is briefly discussed for purposes of enabling one particular embodiment of the invention. Notably, the embodiments of the invention can be practiced using other motion detection systems such as cameras, infrared, optical, touchpad, joysticks, and haptic devices.

Alternatively, the sensing unit 110 can rest on a desk pointing upwards towards the user. The user can place a hand over the sensing unit and interface with a software application on the display. The sensing unit 110 can interface to a computer for controlling a software application on the display. In another embodiment the sensing unit 110 can interface directly with the display and provide the graphics. When the hand is moving in the visual field of the sensing unit 110, the sensing unit 110 can submit positional information to the computer for controlling a cursor object on the display 130, or for interacting with a software application on the display 130. Most touchscreen applications do not require control of a cursor object. A user can interact with the sensing unit 110 in much the same way as a touch screen. The user positions the hand in front of the sensing unit and points a finger to move in directions similar to movement associated with using a touchscreen. The user can select an action by a depressing action similar to the pushing action of a touchpad. The user can navigate the pointing finger in air and project the finger forward in the direction of the sensing unit to signify a depressing action.

The sensing unit 110 can be mounted to the keyboard as illustrated in FIG. 1 proximal to a range of finger movement. In another arrangement, shown in FIG. 1, the sensing unit 110 can attach to or dangle from a display 122. In yet another arrangement, as shown in FIG. 2, the sensing unit 110 can be integrated or mounted to a laptop. The sensing unit can be positioned between the numeric keys and the function keys on the keyboard 100, just above the function keys of the keyboard 100, or on the bottom of a display, dangling below the display, or within a mouse. The user can navigate a cursor 124 on a display 122 without moving the user's hands from a normal typing position and control commands on the cursor such as mouse behaviors. For example, the user can sign to the sensing unit by raising a finger from a normal typing position without necessarily having to move the wrists or the arms. A configuration of the sensing system is briefly discussed for purposes of enabling one particular embodiment of the invention. Notably, the embodiments of the invention can be practiced using other motion detection systems such as cameras, infrared, optical, touchpad, joysticks, and hap tic devices.

During normal typing movement, from the perspective of the sensing unit 110 receiving reflected signals, when multiple fingers are moving, the sensing unit 'sees' incoherent movement. When the user is typing, signals are reflected off the moving fingers causing interference patterns within the sensing unit 110. Accordingly, to mitigate the interference, the processor 122 determines which movements are coherent and which movements are non-coherent. For example, when the user signals an activation cue to the computer, the user ceases typing and raises a single finger that may be generally swept in a slowly and continuous time-varying manner in comparison to normal typing motion where all fingers are moving. The processor 122 identifies coherent motion as an indication by the user that the user is signaling a command to the computer. The detector also determines a completion of a finger motion when movement has ceased or when non-coherent motion resumes. Accordingly, the timer 124 sets a time window for capturing a sign. For example, during normal typing, the fingers are moving in non-coherent motion. The user stops typing and raises a solitary finger and moves the finger in a pattern. The detector 112 senses the coherent and continuous motion and the timer 124 sets a time window for capturing the activation cue. The sensing unit 110 can identify a movement if the finger is within a field of range and the processor 122 can indicate a detection. The indication can be a visual prompt or an audio prompt. Accordingly, the processor 122 coordinates the activities associated with capturing the signal reflections, interpreting the range measurements for coherence, and setting the time expiration.

Referring back to FIG. 2, the sensing unit 110 determines a location of the finger using time of flight measurement. The detector 112 identifies whether the location of the finger is within a first boundary regions (or band), or outside a second boundary region (or band) for activating a control. When the finger is actively navigating the mouse within the field of view, the processor 122 also identifies mouse behavior actions the user initiates. Understandably, the user generally moves the cursor to perform some sort of action such as minimizing a window, sending an email, typing a message, opening a web page and such. In practice, the user hits a mouse button, touchpad, or key to invoke a mouse behavior for accomplishing the action when the cursor is overlaid at the requested action point. The mouse behavior can be one of a single click, a double click, a scroll, a hold, or a button press. Accordingly, the processor 122 keeps track of such information for identifying whether the user has performed a mouse behavior within the field of view. The processor 122 can extend the field of view to a greater radius when the processor 122 determines prolonged active movement within the field of view. The processor 122 adjusting a sensitivity based on a position of the finger and a time length of the finger at a position. Adjusting the sensitivity changes a field of view. In one example, the processor 122 increases the transmit pulse intensity to broaden the field of view. Accordingly, the processor 122 decreases the transmit pulse intensity to lessen the field of view. The processor 122 can also change the sensitivity in software to expand or shrinking the field of view. For example, the processor 122 adjusts a sensitivity by linearly increasing the time of flight value corresponding to the locus of points along the boundary for extending the boundaries. Notably, the processor 122 decreases the boundaries by decreasing the time of flight values associated with the boundary.

Embodiments of the invention also concern a method for identifying and tracking a relative location and movement of an object in a three-dimensional space. The method can include emitting a pulse from a first transducer, estimating a time of flight, and determining a location and relative movement of the object from the time of flight measurements. A time of flight (TOF) can be estimated between when the pulse was transmitted from a transducer and when a reflection of the signal off an object in the three-dimensional space was received from a plurality of sensing elements for producing multiple time of flight measurements. In one aspect, the first transducer can be positioned at a location equidistant from the plurality of other sensing elements. The method can further include converting the location and relative movement to a coordinate object, and conveying the coordinate object to a program for controlling a visual application. For example, the sensing unit 110 of FIG. 1 can emit a pulse from 101, and estimate a TOF from each of the receivers 102-104

A location and relative movement can be determined by creating a complex surface projection from said time of flight measurements, identifying an intersection between said complex surface projections, and identifying a global minimum of the intersection. The processor 122 can identify a local minimum from the intersection of a multiple number of complex surfaces wherein the number of complex surfaces depends on the number of estimated TOFs. That is, each TOF can produce a complex surface. This can include a gradient search or a method of steepest decent. The processor 122 can identify a location and a movement of the object within the sensory field by directly evaluating changes in TOFs through a look up process. The location and relative movement of the object can be converted to a coordinate signal such as a Cartesian coordinate, a polar coordinate, or a vector. The controller 112 can convey the coordinate information to the BlueTooth or USB 170 device to move a cursor object on a display. In one aspect the controller can be a mouse, tablet, or touchscreen device driver. The coordinate object can be converted to one of a BlueTooth and USB format for communicating control information to an application. For example, the coordinate information controls a cursor object on a display.

In one aspect, the method is directed to tracking a finger within a three-dimensional space, detecting a finger action within the three-dimensional space, and performing a user interface command in response to the finger action. This can include determining a length of time a finger stays at a current location, determining if a finger returns to a previous location within a time frame, and determining a distance of movement of said finger within a time frame. The timer 124 within the sensing unit 110 estimates the time frames and the processor performs an action if the length of time exceeds a threshold. For example, a user may issue a finger depress action. The action begins at a first point, moves to a second point, and returns to the first point. The processor 122 and the timer 124 can together determine whether a finger depress action is issued by evaluating location and time differences between detected locations.

Notably, the method includes determining a single finger push action within the sensory field for identifying a mouse single click action, determining a double finger push action within the sensory field for identifying a mouse double click action, determining a finger push-slide action within the sensory field for identifying a mouse click and drag action, determining a finger slide-release action within the sensory field for identifying a mouse drag and release action, and determining a finger push-slide-release action within the sensory field for identifying a mouse click-drag-release action. The aforementioned steps satisfy detecting a touchless finger depression action, a touchless finger slide action, a touchless finger release action, and a touchless finger hold action for invoking a response on a graphical user interface.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An apparatus comprising:
    a touchless sensing unit to generate a three-dimensional ultrasonic sensing space and track a relative location and movement of an object in the three-dimensional ultrasonic sensing space; and
    a controller communicatively coupled to said touchless sensing unit for communicating a coordinate of said object within said three-dimensional space, wherein the sensing unit operates to:
    emit an ultrasonic pulse from a first ultrasonic transducer configured to transmit the ultrasonic pulse that reflects off the object in said three-dimensional space and generates a reflected ultrasonic signal;
    digitally sample the reflected ultrasonic signal to produce a sampled reflected ultrasonic signal;
    suppress a ringing distortion of the sampled reflected ultrasonic signal via digital signal processing
        wherein the ringing distortion is a result of the close proximity interference and residual ringing of the emitted ultrasonic pulse;
        and wherein the suppressing comprises subtracting a contribution of the ringing portion of the emitted ultrasonic pulse from the reflected signal to remove a ring-down effect;
    estimate a time of flight between when said ultrasonic pulse was transmitted from said first ultrasonic transducer and when the suppressed reflected ultrasonic signal was received for a plurality of ultrasonic transducers configured to receive the reflected ultrasonic signal;
    calculate a phase differential between the suppressed reflected ultrasonic signal and a previously received reflected ultrasonic signal both received at a same ultrasonic transducer for the plurality of ultrasonic transducers; and
    determine a location and relative displacement of said object by weighting said time of flight measurements and with said phase differential measurements for the plurality of ultrasonic transducers from repeated operation.

2. The apparatus of claim 1,
    wherein a member of said sensing unit has ultrasonic sensing elements, wherein a first sensing element, a second sensing element, and a third ultrasonic sensing element are symmetrically spaced.

3. The apparatus of claim 1, wherein a member of said sensing unit has at least one ultrasonic sensing element, wherein a first and a second member are spaced at approximately 90 degrees, a second and third member are spaced at approximately 90 degrees, and the third and the first member are spaced at approximately 180 degrees to one another, wherein the sensing unit is less than 10 inches along any length.

4. The apparatus of claim 1, further comprising a center ultrasonic sensing element positioned at a center location that is approximately equidistant from at least one more sensing unit.

5. The apparatus of claim 1, further comprising one more sensing element that is at least one of an acoustic microphone, an acoustic speaker, an ultrasonic receiver, an ultrasonic emitter, a combination acoustic microphone and speaker, an omni-directional ultrasonic transducer, a directional ultrasonic transducer, a micro-electromechanical (MEMS) microphone, an imaging element, an infra-red element, and a camera element.

6. A method for identifying and tracking a relative location and movement of an object in a three-dimensional space comprising:
    emitting a first ultrasonic pulse from a first ultrasonic transducer configured to transmit the ultrasonic pulse at a first time and reflect off an object in said three-dimensional space and generate a first reflected ultrasonic signal;
    emitting a second ultrasonic pulse from the first ultrasonic transducer configured to transmit the ultrasonic pulse at a second time and reflect off the object in said three-dimensional space and generate a second reflected ultrasonic signal;
    digitally sampling the first and second reflected ultrasonic signal to produce first and second sampled reflected ultrasonic signals;
    suppressing a ringing distortion of the first and second reflected ultrasonic signals via digital signal processing;
        wherein the ringing distortion is a result of the close proximity interference, residual ringing of the first and second emitted ultrasonic pulses and an overlap with a ring-down of the first and second emitted ultrasonic pulse;
        and wherein the suppressing comprises subtracting a contribution of the ringing portion of the first and second emitted ultrasonic pulses from the first and second reflected ultrasonic signals to remove the ring-down effect;
    wherein a contribution of the emitted ultrasonic signal is subtracted from the reflected signal according to a symmetry of sensing elements that transmit and receive the ultrasonic signals to suppress the ring-down
    estimating a time of flight between when said second ultrasonic pulse was transmitted from said first ultrasonic transducer and when the second reflected ultrasonic signal was received for a plurality of ultrasonic transducers configured to receive the second reflected ultrasonic signal;
    calculating a phase differential between the first reflected ultrasonic signal and the second ultrasonic reflected signal both received at a same ultrasonic transducer for the plurality of ultrasonic transducers;
    determining a location and relative displacement of said object by weighting said time of flight measurements and with said phase differential measurements for the plurality of ultrasonic transducers; wherein the object is within a predetermined range from the first transducer and plurality of transducers.

7. The method of claim 6, further comprising:
    converting said location and relative movement to a coordinate object; and conveying said coordinate object to a program for controlling a user interface.

8. The method of claim 7, further comprising wirelessly transmitting said coordinate object to a communication device.

9. The method of claim 6, further comprising:
tracking a finger within said three-dimensional space;
detecting a finger action within said three-dimensional space; and
performing a user interface command in response to said finger action.

10. The method of claim 9, further comprising at least one of:
determining a length of time a finger stays at a current location; and
determining if a finger moves away and returns to the current location within a time frame.

11. The method of claim 9, further comprising detecting a touchless finger depression action, a touchless finger slide action, a touchless finger release action, and a touchless finger hold action.

12. The method of claim 9, further comprising:
from the first ultrasonic transducer, emitting a first ultrasonic signal from a first direction at a first time;
from at least one pair of ultrasonic transducers, detecting a first and second ultrasonic reflection of said signal off a finger from said first direction;
calculating a first and second phase differential from said first ultrasonic signal for an ultrasonic transducer of each said pair;
determining a location of said finger from first and second time of flight (TOF) measurements calculated at said pair of ultrasonic transducers; and
updating said location using said phase differentials from each said pair.

13. The method of claim 12, further comprising:
repeating the steps of emitting, detecting, and determining a TOF and said phase differentials for multiple directions at multiple times for generating a plurality of finger locations and relative displacements;
correlating said possible finger locations for determining a finger position having a highest likelihood of producing said reflections from said multiple directions; and
updating said finger locations using said relative displacements through a combinational weighting of said locations and said differentials.

14. The method of claim 6, further comprising:
calculating
a first TOF of a signal emitted at a first time, and
a first phase differential between the signal emitted at the first time and a previously received reflected signal both detected at a first sensor;
calculating
a second TOF of a signal emitted at the first time, and
a second phase differential between said signal emitted at said first time and a previously received reflected signal both detected at a second sensor; and
calculating
a third TOF of a signal emitted at the first time, and
a third phase differential between said signal emitted at said first time and a previously received reflected signal both detected at a third sensor.

15. The method of claim 14, further comprising
calculating a first estimate of a location of said object from a first locus of points produced from said first TOF;
calculating a second estimate of a location of said object from a second locus of points produced from said second TOF;
calculating a third estimate of a location of said object from a third locus of points produced from said third TOF;
creating at least three complex surfaces as a function of said first, second, and third loci of points as an estimate of a location; and
identifying an intersection of said at least three complex surfaces corresponding to a coarse location of said object; and
applying said first, second, and third phase differential to said location for updating said coarse location of said object to a fine location of said object.

16. The method of claim 14, further comprising:
estimating a coarse location of said object using an estimate of said object's location from said TOFs when said object is at a far distance from said sensing unit;
updating said coarse location using a relative displacement of said object using said phase differences when said object is at a close distance from said sensing unit;
employing a combinational weighting of location and relative displacement as said object moves between said far distance and said close distance.

17. The method of claim 16, wherein a phase differential corresponds to a relative displacement of said object and a TOF corresponds to a location of said object, such that a base coordinate of said object can be referenced at a location when said object is at a far distance from said sensing unit, and said base coordinate is updated using said relative displacement as said object nears closer to said sensing unit.

18. The method of claim 17, wherein said base coordinate is updated at one of a faster or slower time interval in accordance with the proximity of the object to the sensing unit.

19. A mobile device having a sensing unit comprising:
an array of sensing elements arranged for said communication device to identify and track touchless finger movements;
at least one sensing element within a boundary of a display of the communication device; and
a controller communicatively coupled to said array and said at least one sensing element for conveying touchless controls to a user interface of said communication device in response to said finger movements
where the controller by way of the at least one sensing element: emits a sequence of ultrasonic pulses from a first ultrasonic transducer configured to transmit the sequence of ultrasonic pulses that reflect off an object to produce reflected ultrasonic signals;
digitally sample the reflected ultrasonic signals to produce sampled reflected ultrasonic signals;
suppress a ringing distortion of the sampled reflected ultrasonic signals via digital signal processing;
wherein the ringing distortion is a result of the close proximity interference, residual ringing of the emitted ultrasonic pulse and an overlap with a ring-down of the emitted ultrasonic pulses;
and wherein the suppressing comprises subtracting a contribution of the ringing portion of the emitted ultrasonic pulses from the reflected signals to remove a ring-down effect;
estimates a time of flight between when one ultrasonic pulse of the sequence was transmitted from said first ultrasonic transducer and when the reflected ultrasonic signal generated from a reflection of said one ultrasonic pulse off an object in said three-dimensional space was received for a plurality of ultrasonic transducers configured to receive the reflection of said one ultrasonic pulse;
calculates a phase differential between the reflected ultrasonic signal and a previously received ultrasonic reflected signal at each ultrasonic transducer for the plurality of ultrasonic transducers; and determines a location and relative displacement of said object f-rein by weighting said time of flight measurement with said phase differential measurement for the plurality of ultrasonic transducers, wherein the sensing unit is less than 10 inches along any length.

20. The mobile device of claim 19, wherein said at least one sensing element emits a direct pulse to said array to estimate an angle of the display of said communication device.

* * * * *